US012167289B2

(12) United States Patent
Abraham et al.

(10) Patent No.: US 12,167,289 B2
(45) Date of Patent: Dec. 10, 2024

(54) SYSTEMS AND METHODS TO ADDRESS CALL FAILURES IN 5G NETWORKS DUE TO QOS FLOW DESCRIPTION

(71) Applicant: Cisco Technology, Inc., San Jose, CA (US)

(72) Inventors: Jis Abraham, Bangalore (IN); Pavan Kumar Devulacheruvu Nageswararao, Bengaluru (IN); Venkata Mohana Krishna Prasanna Anjaneyulu Pendela, Bengaluru (IN)

(73) Assignee: Cisco Technology, Inc., San Jose, CA (US)

( * ) Notice: Subject to any disclaimer, the term of this patent is extended or adjusted under 35 U.S.C. 154(b) by 379 days.

(21) Appl. No.: 17/675,602

(22) Filed: Feb. 18, 2022

(65) Prior Publication Data

US 2023/0269645 A1  Aug. 24, 2023

(51) Int. Cl.
*H04W 36/18* (2009.01)
*H04W 36/00* (2009.01)

(52) U.S. Cl.
CPC ....... *H04W 36/18* (2013.01); *H04W 36/0044* (2013.01); *H04W 36/0066* (2013.01)

(58) Field of Classification Search
CPC ............. H04W 36/18; H04W 36/0044; H04W 36/0066
See application file for complete search history.

(56) References Cited

U.S. PATENT DOCUMENTS

| 11,140,574 B1* | 10/2021 | Sharma ............ H04W 28/0268 |
| 2014/0204736 A1* | 7/2014 | Bakker ............ H04W 28/0215 370/230 |
| 2018/0192333 A1 | 7/2018 | Wu |
| 2019/0150225 A1* | 5/2019 | Mohamed ............ H04W 8/08 370/329 |
| 2020/0022031 A1* | 1/2020 | Li ................ H04W 36/0044 |
| 2020/0077315 A1 | 3/2020 | Jin et al. |
| 2020/0383011 A1 | 12/2020 | Wang |

FOREIGN PATENT DOCUMENTS

WO   2020038562   2/2020

* cited by examiner

*Primary Examiner* — Michael A Keller
(74) *Attorney, Agent, or Firm* — Polsinelli P.C.

(57) ABSTRACT

Disclosed are systems, apparatuses, methods, and computer-readable media to address bearer loss during inter-radio access technology (RAT) handovers. A method includes sending a create bearer request for establishing a service for the mobile device using a first connection; receiving a create bearer response message to setup a second connection for the mobile device to continue the service; and, in response to the create bearer response message, sending an update bearer request message to provide the mobile device with the QoS information associated with the second connection, the QoS information allowing the mobile device to verify an existing QoS flow to continue the service after the handover. In some cases, a user equipment (UE) may delete a mapping between a QoS information when a previous message does not include an evolved packet core (EPC) bearer indicator (EBI) that identifies QoS policies.

20 Claims, 9 Drawing Sheets

SYSTEMS AND METHODS TO ADDRESS CALL FAILURES IN 5G NETWORKS DUE TO QOS FLOW DESCRIPTION

DESCRIPTION OF THE RELATED TECHNOLOGY

Wireless communication networks have grown exponentially for many years. Long Term Evolution (LTE) systems provide high peak data rates, low latency, improved system capacity, and low operating costs due to a simplified network architecture. The LTE system (4G) also provides seamless integration of older wireless networks, such as global system for mobile communication (GSM), code division multiple access (CDMA), and Universal Mobile Telecommunications System (UMTS). In an LTE system, an evolved universal terrestrial radio access network (E-UTRAN) includes a plurality of evolved Node Bs (eNBs) that communicate with a plurality of mobile stations, referred to as User Equipments (UEs). The 3rd generation partnership project (3GPP) networks typically include a mixture of prior communication systems. As network design has been optimized, many improvements have been made through the evolution of various standards. The Next Generation Mobile Network (NGMN) committee has decided to focus future NGMN activities on defining the end-to-end requirements of a fifth generation (5G) New Radio (NR) system.

In 5G/NR, a Protocol Data Unit (PDU) session defines an association between a UE and a data network. Each PDU session is identified by a PDU Session identifier (PSI) and may include multiple quality of service (QoS) flows and QoS rules. The 5G session management (5GSM) procedure maintains state machines for the different 5GSM sublayer states of PDU session handling in the UE.

The 5G PDU session establishment is an equivalent process to the Packet Data Network (PDN) connection (bearer) process in 4G/LTE. Each PDN includes an Access Point Name (APN) Network identifier that defines the PDN to which the UE requests a connection, and may also include an APN operator identifier that defines the Public Land Mobile Network (PLMN) in which the PDN gateway is located. In 4G/LTE, an Evolved Packet System (EPS) session management (ESM) process maintains state machines for different ESM sublayer states for EPS bearer context handling in the UE. There are two different ESM sublayer states available in the state machine for EPS bearer handling: bearer context active and bearer context inactive.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
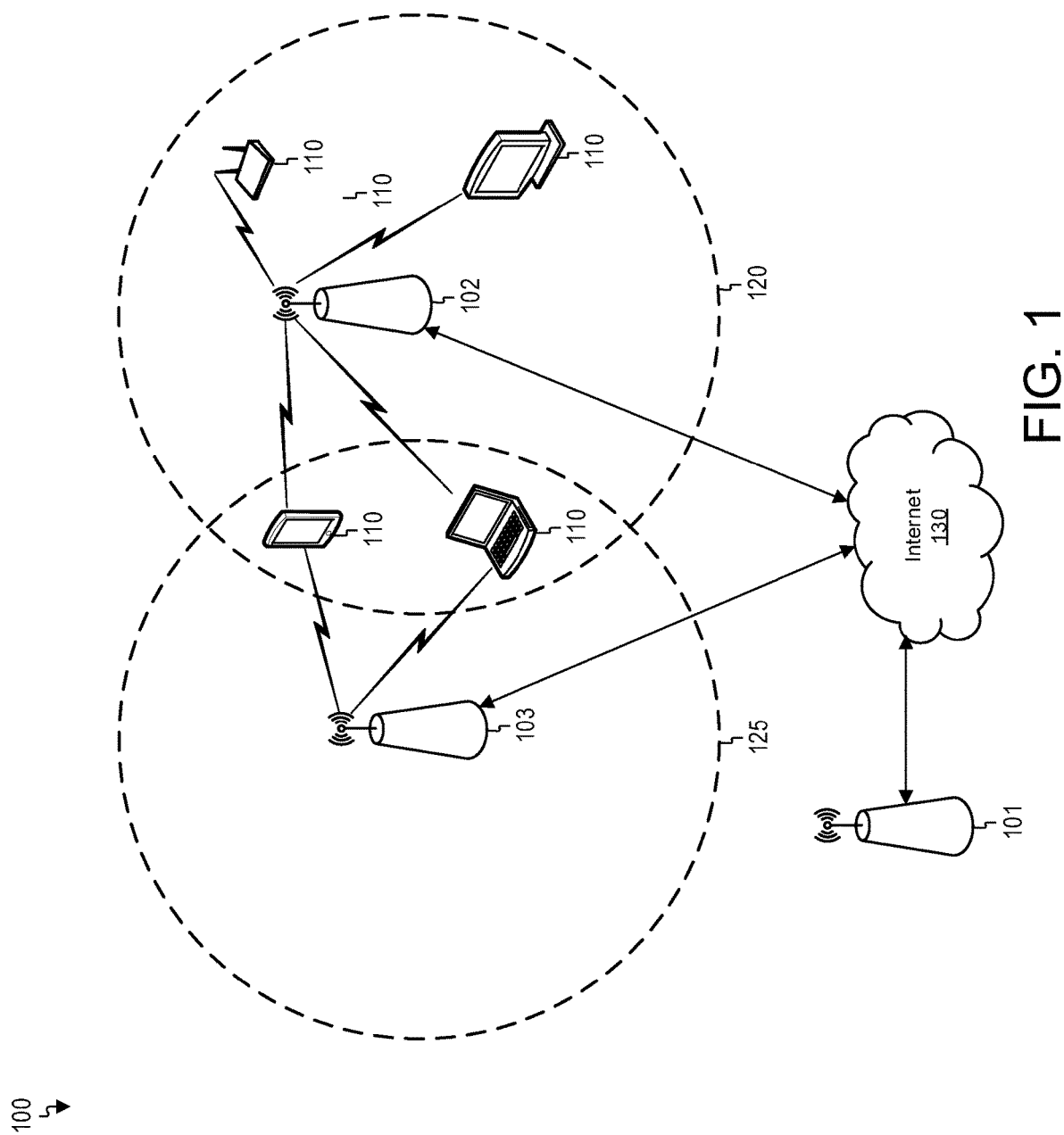
FIG. 1 illustrates an example wireless network according to an example of the instant disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

A method is disclosed to prevent bearer loss during radio access technologies (RAT) handover. In some examples, a session management function (SMF) may be configured to determine that RAT interworking is enabled and sends an update bearer request message to provide the user equipment (UE) with quality of service (QoS) information to bearer mapping when the UE is in a 4G RAT to ensure that the UE does not delete the bearer during subsequent inter RAT handovers.

Systems, methods, and computer-readable media are provided for updating information to ensure continuity of service for a mobile device switching between a 4G network and a 5G network. An example method can include sending a create bearer request during for setup of a service with the mobile device during a first connection, wherein the create bearer request includes QoS information for the service; receiving a create bearer response message to setup a second connection based on the service, wherein a base station serving the mobile device cannot provide the service; and in response to the create bearer response message, sending an update bearer request message to provide the mobile device with the QoS information associated with a second connection.

An example system can include one or more processors and at least one computer-readable storage medium storing instructions which, when executed by the one or more processors, cause the one or more processors to send a create bearer request during for setup of a service with the mobile device during a first connection, wherein the create bearer request includes QoS information for the service; receive a create bearer response message to setup a second connection based on the service, wherein a base station serving the mobile device cannot provide the service; and in response to the create bearer response message, send an update bearer request message to provide the mobile device with the QoS information associated with a second connection.

In some examples, the mobile device deletes (e.g., remove an association) the QoS information associated with the second connection during handover to the second connection, and wherein the update bearer request message restores the QoS information associated with the second connection.

In some examples, the method further comprises determining that interworking is enabled, wherein the update bearer request message is sent when the interworking is enabled.

In some examples, the second connection comprises a 5G connection and the first connection comprises a 4G connection.

In some examples, the mobile device initially attaches using the 4G connection.

In some examples, the update bearer request message includes an evolved packet system (EPS) bearer indicator included in the create bearer response message, wherein the create bearer response message includes the EPS bearer indicator.

In some examples, the EPS bearer identifier of the second connection and the QoS information are associated with the second connection.

In some examples, the create bearer response message establishes the second connection with the mobile device.

Example Embodiments

In the wireless communication field, there are many competing and evolving different RATs to communicate over wireless channels to increase bandwidth, decrease latency, and increase capacity. For example, fifth generation (5G) communication systems increase bandwidth by operating in higher frequencies (e.g., 60 gigahertz) to accomplish higher data rates. However, 5G communication systems are being deployed and many services still may fall back to existing fourth generation (4G) services such as Long Term Evolution (LTE) due lack of availability, service compatibility, and so forth. In some cases, a UE may experience call or session failure when handing over between 4G and 5G due to different services. In some cases, the UE may experience call or session failure during 4G to 5G to 4G handovers due to missing mapping of an EPS bearer indicator (EBI) and QoS-Flow-Identifier (QFI) part of QoS Flow-Descriptions. In these cases, the UE will end up deleting the EPS Bearer after moving from 5G to 4G, which causes an ongoing call to be dropped (e.g., a voice/video/RCS failure).

A solution is described that can be performed by a SMF to ensure that the UE receives the QoS-Flow-Identifier (QFI) to EBI mapping when the UE is in 4G RAT so that inter-RAT handovers can go through without any call loss. In particular, the SMF receives a create bearer response message during a first connection, determines that the UE has interworking enabled (e.g., from a create session request), and, in response to determining that interworking is enabled, sends an update bearer request message to provide the UE with QoS-Flow-descriptions IE having a QFI parameter to EBI mapping.

The present technology ensures that the UE can identify the right QoS flow-description parameters to prevent issues with a wireless connection. The present technology allows the UE to identify the QoS policy (specifically a QFI to EBI mapping) and ensure that the appropriate QoS is applied to maintain the connection in 4G and 5G communication systems, regardless of the implementation of the technical specifications in the UE.

In some examples, third generation partnership project (3GPP) 23.502 defines operations for a UE to perform to attach to a 5G RAT and achieve EPS interworking to allow fallback operations to 4G. An SMF plus packet data network (PDN) gateway (PGW) control plane function (SMF+PGW-C) provides EBIs to the UE and next generation (NG) radio access networks (NG-RAN) using an N1 session management (SM) network access stratum (NAS) message and an N2 SM message. The UE and the PGW-C+SMF store an association between a QoS flow, the EBI, and the EPS QoS parameters.

When the UE is served by an evolved packet core (EPC) during PDN connection and dedicated bearer establishment, the PGW-C+SMF performs EPS QoS mappings from the 5G QoS parameters that are obtained from a policy control function (PCF), and allocates a traffic flow template (TFT) with policy and charging control (PCC) rules obtained from the PCF.

Additional 5G QoS parameters associated with the PDN connection (e.g., session aggregate maximum bitrate (AMBR), QoS rules, QoS flow level QoS parameters, etc.) are sent to the UE in a protocol configuration options (PCO). The UE and the PGW-C+SMF store the association between the EPS Context and the protocol data unit (PDU) Session Context to use during a handover from EPS to 5G. During the EPS bearer establishment/modification procedure, the QoS rules of the related EPS bearers are allocated/modified and sent to UE in an evolved PCO (ePCO). The 5G QoS parameters are stored in the UE and used when the UE performs a handover from EPS to 5G.

A PDU session defines the association between the UE and the data network that provides a PDU connectivity service. Each PDU session may include multiple QoS flows and QoS rules. In a 5G network, QoS flow is the finest granularity for QoS management to enable more flexible QoS control and is conceptually similar to EPS bearers in 4G.

When a QoS flow is added in a 4G connection, such as during call (e.g., voice/video/RCS, etc.) creation, the network provides a QoS flow description information element (IE) to the UE that includes a list of QoS flow descriptions. Each QoS flow description comprises a QoS flow identity (QFI), a QoS flow operation code, QoS flow parameters, and a QoS flow parameters list. The parameter list can include the EBI that identifies the EPS bearer that is mapped to or associated with the QoS flow. Whereas, if a QoS Flow is added in 5G, i.e. during call (voice/video/res) creation, the network can provide a mapped EPS bearer context IE, which comprises a list of mapped EPS bearer contexts and includes the EBI, a length of mapped EPS bearer context, an EPS bearer operation code, a number of EPS bearer parameters, and an EPS bearer parameter list. Each mapped EPS bearer context is associated with a QoS flow through the EBI.

When the UE is provided with a QoS flow description or an EBI of an existing QoS flow description is modified by the ePCO (via an activate default eps bearer context request or activate dedicated eps bearer context request message), the UE checks whether the EBI included in the QoS flow description corresponds to an active EPS bearer context of the PDN connection associated with the EPS bearer context being activated. If the EBI included in the QoS flow description does not correspond to any active EPS bearer context of the PDN connection associated with the EPS bearer context being activated, the UE can locally delete the QoS flow description and all the associated QoS rules, if any, and include a PCO or ePCO with a 5G session management (5GSM) that identifies an error in the QoS operation. A deletion in some cases can be removal of an association (e.g., a key-value pair) that can map information in different data structures. For example, the QoS flow description can include an identifier that identifies the associated QoS rules and, removing the identifier, and unlink the QoS flow description.

However, in some cases, a UE may be implemented to delete the QoS flow description and associated QoS rules when the EBI is not included in a QoS flow description. This same issue exists when a UE creates a PDN connection in 4G, performs handover to 5G and then returns to a 4G connection. In some cases, during handover to 5G, there is no mechanism to update the mapping of the QoS flow description to the EBI.

While this issue has been addressed by release 16.3 of 24.501 3GPP, there are many pre 16.3 release UEs in the network already and the solution provided by 3GPP does not address handover failures that are experienced by pre 16.3 release UEs. In some cases, pre 16.3 release UEs are encountering voice call continuity issues during inter-RAT handover because there are many areas without 5G coverage. Customers are only aware that calls are being dropped and may complain to network providers. Network providers are only able to recommend that users disable 5G in their UEs.

Figure 2:
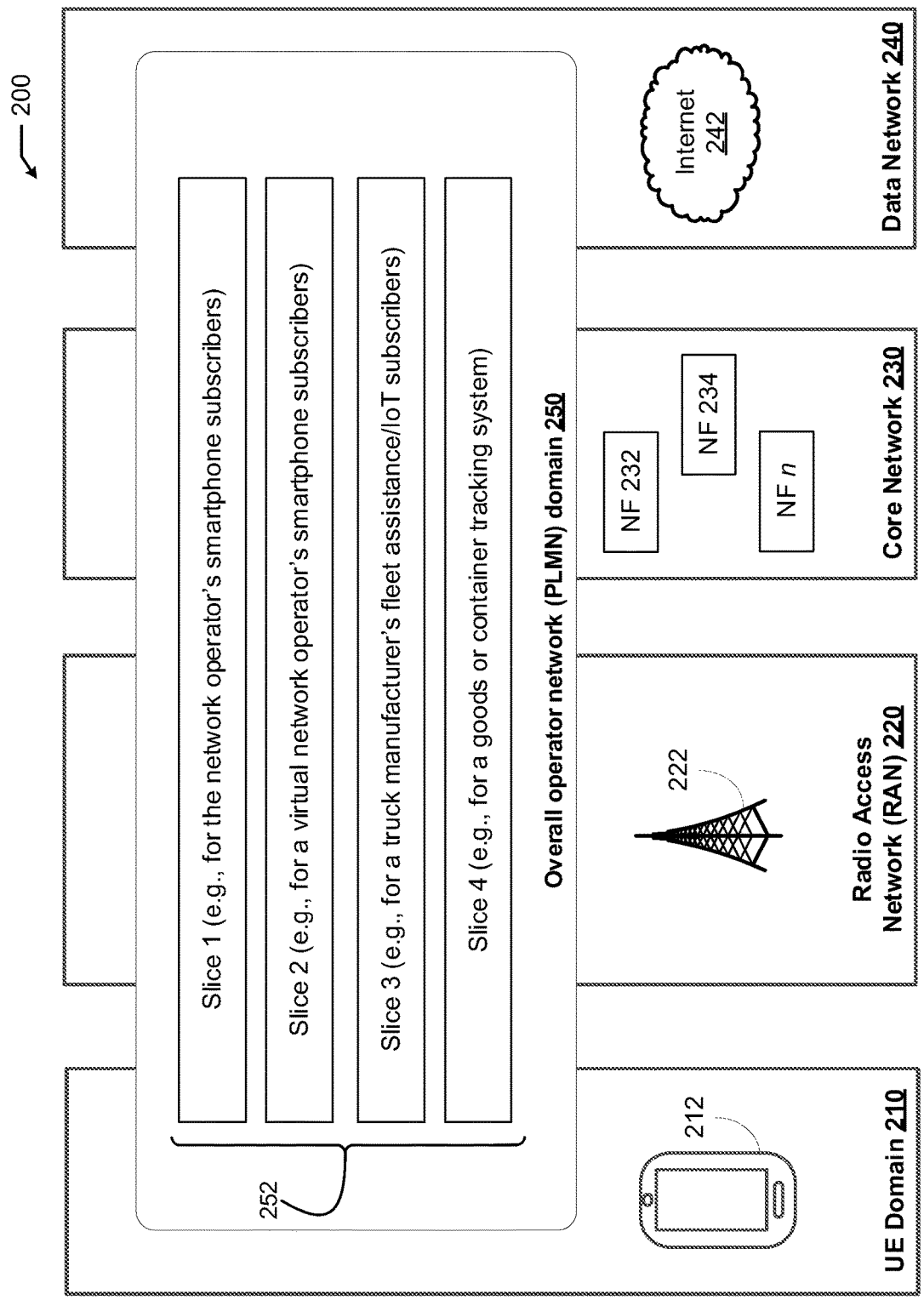
FIG. 2 depicts an exemplary schematic representation of a fifth generation (5G) network environment in which network slicing has been implemented according to an example of the instant disclosure.

A description of network environments and architectures for network data access and services, as illustrated in FIGS. 1 and 2, is first disclosed herein. A discussion of bearer loss during inter-RAT handover in FIGS. 3A, 3B, and 4 will then follow. Methods and techniques to prevent bearer loss during inter-RAT handover will be described in FIGS. 5, 6, and 7. The discussion then concludes with a brief description of example devices, as illustrated in FIG. 8. These variations shall be described herein as the various embodiments are set forth. The disclosure now turns to FIG. 1.

FIG. 1 illustrates an example wireless network according to an example of the instant disclosure. The embodiment of the wireless network shown in FIG. 1 is for illustration only. Other embodiments of the wireless network 100 could be used without departing from the scope of this disclosure.

As shown in FIG. 1, the wireless network includes a base station (BS) such as a next generation node B (gNB) 101, a gNB 102, and an evolved node B (eNB) 103. The gNB 101 communicates with the gNB 102 and the eNB 103. The gNB 101 also communicates with at least one network 130, such as the Internet, a proprietary Internet Protocol (IP) network, or other data network.

The gNB 102 provides wireless broadband access to the network 130 for a first plurality of UEs 110 within a coverage area 120 of the gNB 102. In some examples, a UE refers to remote wireless equipment that wirelessly accesses a BS, whether the UE is a mobile device (e.g., a mobile telephone, a smartphone, a laptop) or is normally considered a stationary device (e.g., a desktop computer, a point-of-sale system). The eNB 103 provides wireless broadband access to the network 130 for a second plurality of UEs within a coverage area 125 of the eNB 103. In some embodiments, one or more of the gNB 101, gNB 102, and eNB 103 may communicate with each other and with the UEs 110 using 5G, LTE, LTE Advanced (LTE-A), WiMAX, WiFi, or other wireless communication techniques. In some examples, a BS may provide wireless access in accordance with one or more wireless communication protocols (e.g., 3GPP new radio interface/access (NR), LTE, LTE-A, LTE-A, high speed packet access (HSPA), WiFi 802.11a/b/g/n/ac/ax/be, etc.).

The eNB 103 provides a coverage area 120 and the eNB 103 provides a coverage area 125, which are shown as approximately circular for the purposes of illustration and explanation only. The coverage areas associated with gNBs, such as the coverage area 120 and coverage area 125, may have other shapes, including irregular shapes, depending upon the configuration of the gNBs and variations in the radio environment associated with natural and man-made obstructions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102 or eNB 103 could communicate directly with the network 130 and provide UEs with direct wireless broadband access to the network 130. Further, the gNB 101, gNB 102, and/or eNB 103 could provide access to other or additional external networks, such as external telephone networks or other types of data networks.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a UE domain 210, e.g. of one or more enterprise, in which a plurality of user cellphones or other connected devices 212 reside; a Radio Access Network (RAN) 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support software as a service (SaaS) providers configured to provide SaaSs to enterprises, e.g. to users in the UE domain 210.

Core Network 230 contains a plurality of NFs, shown here as NF 232, NF 234 . . . NF n. In some embodiments, core network 230 is a 5G core network (5GC) in accordance with one or more accepted 5GC architectures or designs. In some embodiments, core network 230 is an EPC network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, the SMF controls session establishment, modification, release, etc., and in the course of doing so, provides other NFs with access to these constituent SMF services.

In some embodiments, the plurality of NFs of core network 230 can include one or more Access and Mobility Management Functions (AMF) which is typically used when core network 230 is a 5GC network and Mobility Management Entities (MME) which is typically used when core network 230 is an EPC network, collectively referred to herein as an AMF/MME for purposes of simplicity and clarity. In some embodiments, an AMF/MME can be common to or otherwise shared by multiple slices of the plurality of network slices 252, and in some embodiments an AMF/ MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); PCFs; Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an Internet of things (IoT) goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of UE, 5G networks incorporate the network slicing concept utilized in previous generation architectures.

Within the scope of the 5G mobile and wireless network architecture, a network slice comprises a set of defined features and functionalities that together form a complete PLMN for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/ MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

Figure 3A:
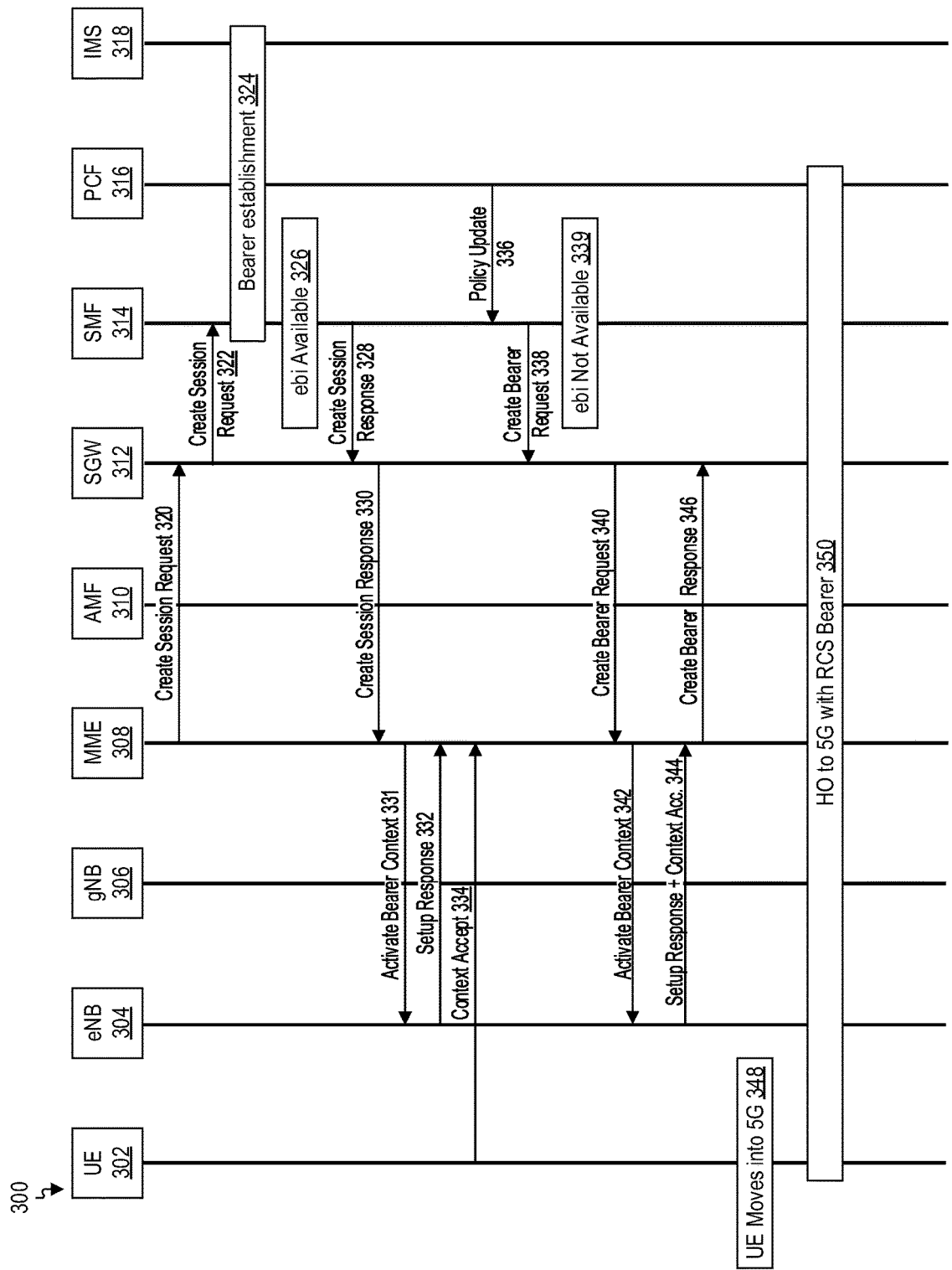
FIGS. 3A and 3B illustrate a flow diagram that causes a call failure due to radio access technology (RAT) handover according to an example of the instant disclosure.
Figure 3B:
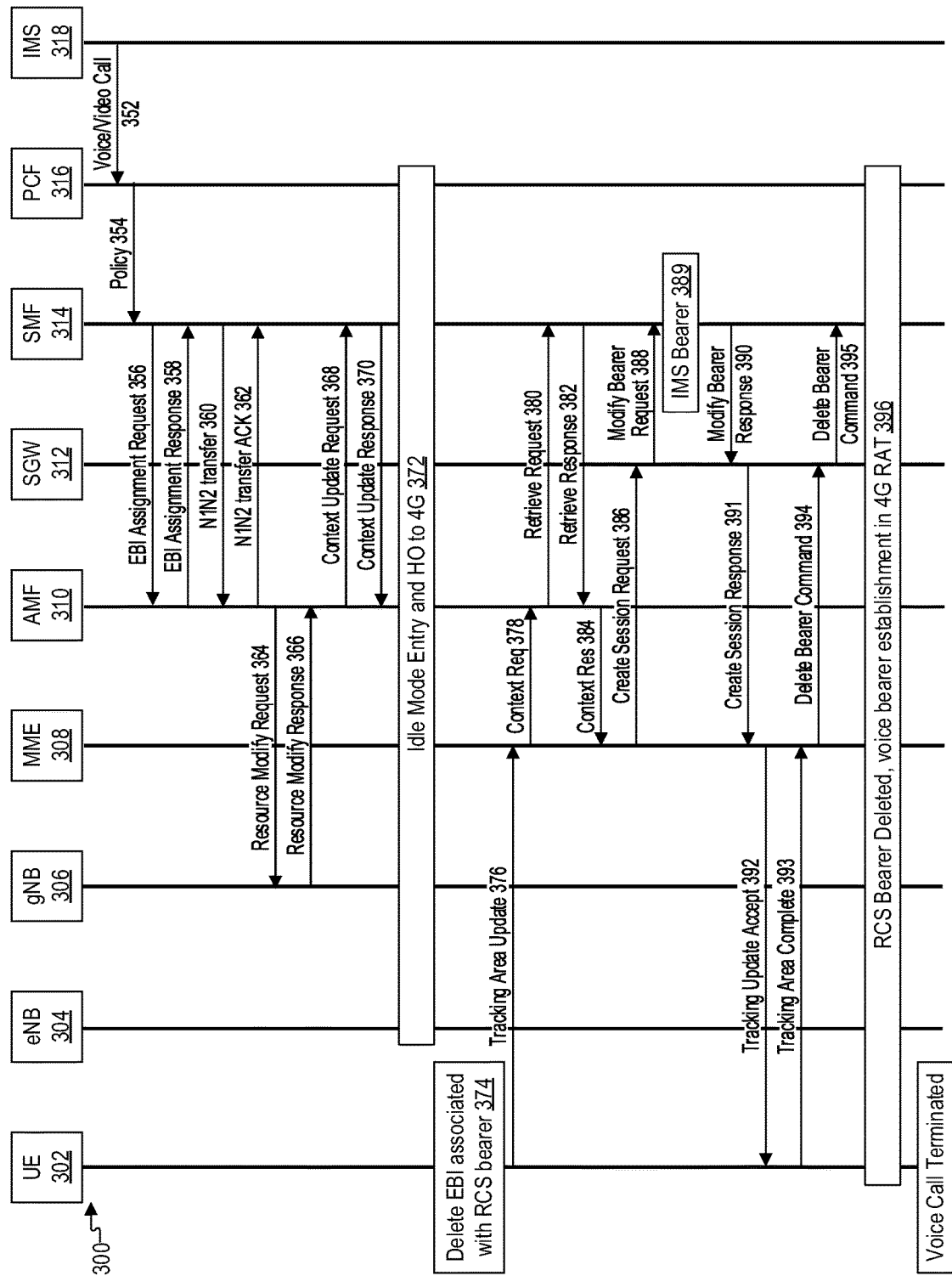

FIGS. 3A and 3B illustrate a flow diagram 300 that causes a call failure due to RAT handover. In particular, the flow diagram 300 describes an EPS fallback from 5G that causes a call failure. The flow diagram 300 begins with a UE 302 attaching to an eNB 304, and the UE 302 will transfer to the gNB 306. Initially, an MME 308 transmits a create session request 320 to a serving gateway (SGW) 312 that includes an EBI (e.g., EBI=6), which transmits a create session request 322 to the SMF 314 with the EBI. The SMF 314 establishes bearers (e.g., a default bearer) with the PCF 316 and the IP multimedia subsystem (IMS) 318 at block 324. The create session request can include a default bearer for end to end transition for signaling and data traffic, and the default bearer identifies the best service for the UE at the time of the initial attachment and an IP address for the UE. As a result of the create session request 322, the SMF 314 will store and have the EBI available for subsequent operations at block 326. In response to the create session request 322, the SMF 314 will transmit a create session response 328 to the SGW 312 including an ePCO that includes QoS policies (e.g., rules and descriptions) and a mapping of QoS policies to the EBI (e.g., EBI=6). The SGW 312 will then initialize the session with the UE 302 by transmitting a create session response 330 including the ePCO to the MME 308, which transmits an activate bearer context 331 (e.g., E-RABSetupRequest Activate Default EPS Bearer Context) to the eNB 304 that includes the ePCO. The eNB 304 will setup the connection and transmit a setup response 332 (e.g., E-RABSetupResponse) to the MME 308. The UE 302 transmits a context accept 334 (e.g., Activate Dedicated EPS Bearer Context Accept) to the MME 308 to initialize the connection using the default bearer.

The UE 302 begins the establishment of a rich communication services (RCS) call and the PCF 316 transmits a policy update notification 336, which includes RCS rules and QoS information, to the SMF 314. In response to the policy update notification 336, the SMF 314 transmits a create bearer request 338 to the SGW 312 that includes an ePCO having QoS information and information related to a dedicated bearer. The dedicated bearer provides a dedicated tunnel to one or more specific type of traffic (e.g., RCS call, video, etc.) based on the default bearer and uses an IP address of the default bearer. The ePCO in the create bearer request 338 does not include EBI that is mapped to the QoS-Flow-Descriptions because the EBI is not yet available and the EBI is an optional parameter as indicated in block 339.

The SGW 312 transmits a create bearer request 340 to the MME 308 including the ePCO and the MME 308 transmits an activate bearer context 342 including the ePCO to the eNB 304. The eNB 304 transmits a setup response and context accept message 344 back to the MME 308. In some cases, the setup response and the context accept message are separate and are illustrated as a single message for simplicity. The MME 308 transmits a create bearer response 346 back to the SGW 312 that includes an EBI associated with the RCS call (e.g., EBI=7). At block 348, the UE 302 moves into 5G coverage with the gNB 306 and, at block 350, handover to 5G occurs with an RCS bearer created based on the policy update notification 336.

FIG. 3B illustrates that the IMS 318 initializes a voice or video call that is not supported by the gNB 306 and must perform an EPS fallback to establish the call. The IMS 318 transmits the voice or video call information 352 to the PCF 316, which transmits a policy update notification 354 to the SMF 314. The policy update notification 354 includes communication rules (e.g., voice rules) and QoS information necessary for the voice or video call. The SMF 314 transmits an EBI assignment request 356 to the AMF 310 to initiate the EPS fallback. The AMF 310 returns the EBI assignment response 358 to the SMF 314 which includes EBIs of the current services. The SMF 314 then transmits an N1N2 transfer message 360 to request QoS information of the services and receives an N1N2 transfer acknowledgment 362. The AMF 310 transmits a resource modify request 364 to the gNB 306 to initialize the voice or video call.

In some examples, the gNB 306 does not support the voice or video call over NR and transmits a resource modify response 366 indicating that an EPS fallback is required. The AMF 310 thereby transmits a context update request 368 to the SMF 314 to perform the EPS fallback and the SMF 314 transmits a context update response to the AMF 310 at block 370. At block 372, an idle mode entry occurs and a handover to the 4G connection.

At block 374, the UE 302 deletes the EBI associated with a previous connection (e.g., EBI=7) because its unable to find a mapping between the QFI and the EBI. The UE 302 transmits a tracking area update 376 to the MME 308 including its EBI (e.g., EBI=6) that omits the EBI associated with the RCS bearer. The MME 308 transmits a context request 378 to the AMF 310 to retrieve the QoS and the AMF 310 transmits a retrieve context request associated with previous EBIs from the SMF 314 at block 380. The SMF 314 transmits a context retrieve response 382 that identifies previous EBIs (e.g., EBI=6, EBI=7) to the AMF 310 and the AMF 310 transmits a context response 384 to the MME 308.

In response, the MME 308 transmits a create session request 386 identifying previous EBIs (e.g., EBI=6 [to be created], EBI=7 [to be removed]) to the SGW 312 and the SGW 312 transmits a modify bearer request 388 to the SMF 314. The SMF 314 identifies the various bearers including the RCS bearer at block 389 and transmits a modify bearer response 390 to the SGW 312, which transmits a creates session response 391 to the MME 308. The MME 308, having only received the EBI=6 in the tracking area update 376, transmits a tracking update accept to the UE 302 that identifies the EBI associated with the initial setup (e.g., EBI=6) and omits the EBI associated with the RCS bearer (e.g., EBI=7).

The UE 302 receives the tracking update accept 392 and transmits a tracking area complete 393 to the MME 308, which only identifies the initial EBI (e.g., EBI=6). The MME 308 transmits a delete bearer command 394 that identifies the RCS bearer (e.g., EBI=7) to the SGW 312, which issues a delete bearer command 395 to the SMF 314. The RCS bearer is deleted at block 396, which results in a RCS call loss after handover to the 4G RAT at block 397. For example, the RCS call here is not gracefully terminated.

In the example illustrated in FIGS. 3A and 3B, the UE 302 attaches in a 4G network and creates an RCS bearer. The SMF 314 does not include the EBI in the QoS flow descriptions IE in the create bearer request 338 sent to the MME 308 for the RCS bearer. The UE 302 subsequently moves to 5G with an RCS bearer. A voice or video call is initiated in the 5G network and an EPS fallback is initiated because the gNB 306 does not support voice of NR (VoNR) and but the eNB 304 supports Voice over LTE (VoLTE). After handover to 4G, the RCS bearer is lost when the UE 302 deletes the bearer because the UE cannot find the association between the QFI and the EBI for the RCS bearer and the UE drops the call.

Figure 4:
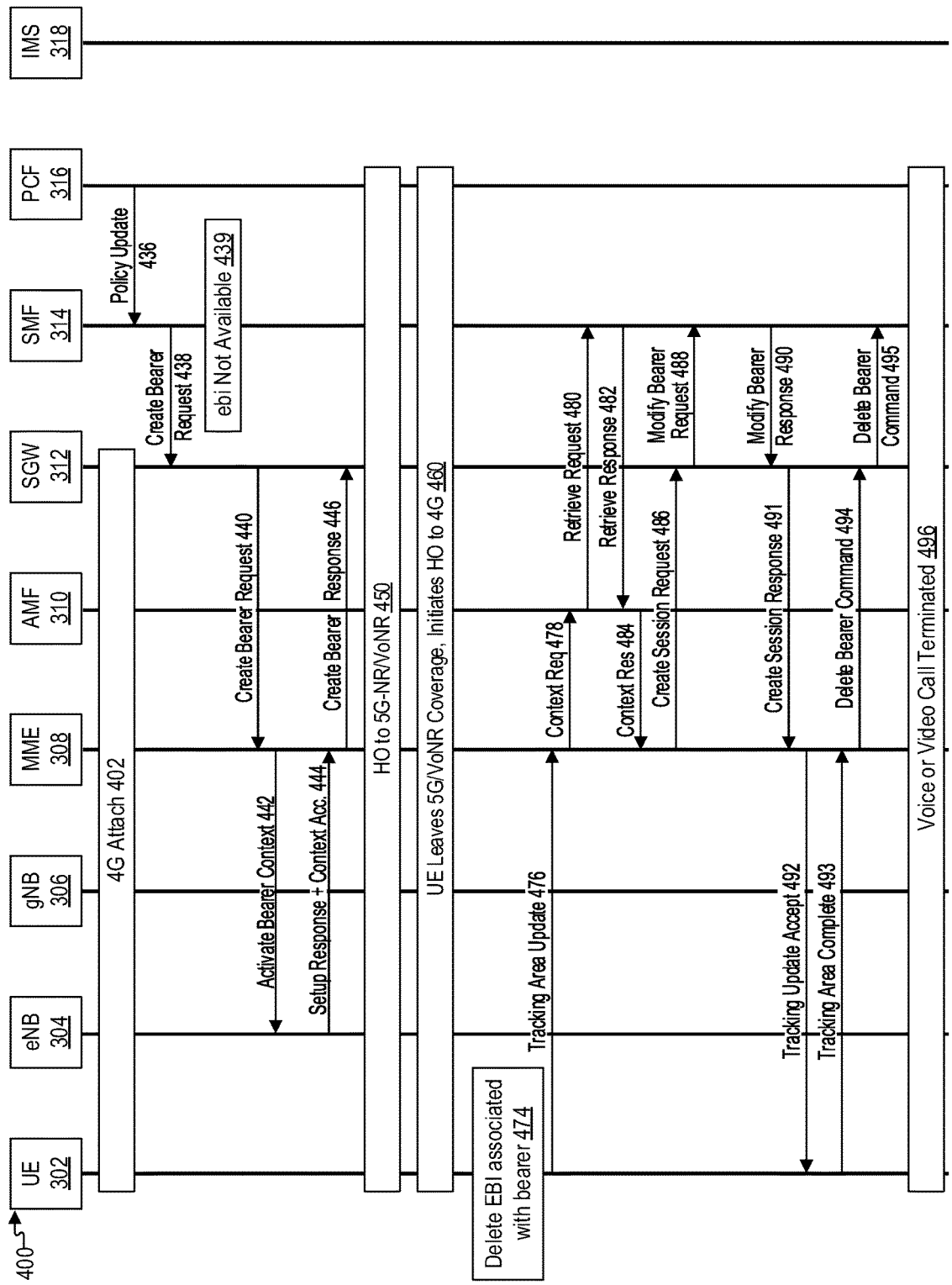
FIG. 4 illustrate a flow diagram that causes a call failure due to RAT handover according to an example of the instant disclosure.

FIG. 4 illustrates a flow diagram 400 that causes a call failure due to RAT handover. In particular, the flow diagram 400 describes voice call failure after an inter-RAT handover as a result of the UE deleting the bearer because of unavailability of an EBI association with QFI present as part of QoS-Flow-descriptions IE. Although not illustrated, FIG. 4 begins with a 4G attach process at block 402, which corresponds to the subject matter as described above in connection with FIG. 3A and the issuance of an EBI (e.g., EBI=7) for a dedicated bearer based on a communication feature in 5G. In particular, FIG. 4 describes a call failure as a result of initializing a call in VoLTE that is handed over to VoNR for 5G and is returned to VoLTE when the UE moves out of 5G coverage.

The UE 302 begins the establishment of a voice or video call and the PCF 316 transmits a policy update notification 436, which includes call rules and QoS information, to the SMF 314. In response to the policy update notification 436, the SMF 314 transmits a create bearer request 438 to the SGW 312 that includes an ePCO having QoS information and information related to a dedicated bearer. The dedicated bearer provides a dedicated tunnel to one or more specific type of traffic (e.g., voice, video, etc.) based on the default bearer and uses an IP address of the default bearer. The ePCO in the create bearer request 438 does not include EBI that is mapped to the QoS flow descriptions IE because the EBI is not yet available and the EBI is an optional parameter as indicated in block 439.

The SGW 312 transmits a create bearer request 440 to the MME 308 including the ePCO and the MME 308 transmits an activate bearer context 442 including the ePCO to the eNB 304. The eNB 304 transmits a setup response and context accept message 444 back to the MME 308. In some cases, the setup response and the context accept message are separate and are illustrated as a single message for simplicity. The MME 308 transmits a create bearer response 446 back to the SGW 312 that includes an EBI associated with the voice call (e.g., EBI=7).

At block 450, the UE 302 moves into 5G coverage that includes VoNR coverage and initiates and succeeds in handover to 5G coverage. At block 460, the UE moves out of VoNR coverage and the UE initiates handover back into 4G.

At block 474, the UE 302 deletes the EBI associated with a previous connection (e.g., EBI=7) because its unable to find a mapping between QoS-Flow-Descriptions (specifically QFI) and the EBI. The UE 302 transmits a tracking area update 476 to the MME 308 including its EBI (e.g., EBI=6) that omits the EBI associated with the dedicated bearer. The MME 308 transmits a context request 478 to the AMF 310 to retrieve the QoS and the AMF 310 transmits a retrieve context request associated with previous EBIs from the SMF 314 at block 480. The SMF 314 transmits a context retrieve response 482 that identifies previous EBIs (e.g., EBI=6, EBI=7) to the AMF 310 and the AMF 310 transmits a context response 484 to the MME 308.

In response, the MME 308 transmits a create session request 486 identifying previous EBIs (e.g., EBI=6 [to be created], EBI=7 [to be removed]) to the SGW 312 and the SGW 312 transmits a modify bearer request 488 to the SMF 314. The SMF 314 identifies the various bearers and transmits a modify bearer response 490 to the SGW 312, which transmits a creates session response 491 to the MME 308. The MME 308, having only received the EBI=6 in the tracking area update 476, transmits a tracking update accept to the UE 302 that identifies the EBI associated with the initial setup (e.g., EBI=6) and omits the EBI associated with the dedicated bearer (e.g., EBI=7).

The UE 302 receives the tracking update accept 492 and transmits a tracking area complete 493 to the MME 308, which only identifies the initial EBI (e.g., EBI=6). The MME 308 transmits a delete bearer command 494 that identifies the bearer (e.g., EBI=7) to the SGW 312, which issues a delete bearer command 495 to the SMF 314. The voice or video bearer is deleted, which results in non-graceful termination of the voice or video after handover to the 4G RAT at block 496.

Figure 5:
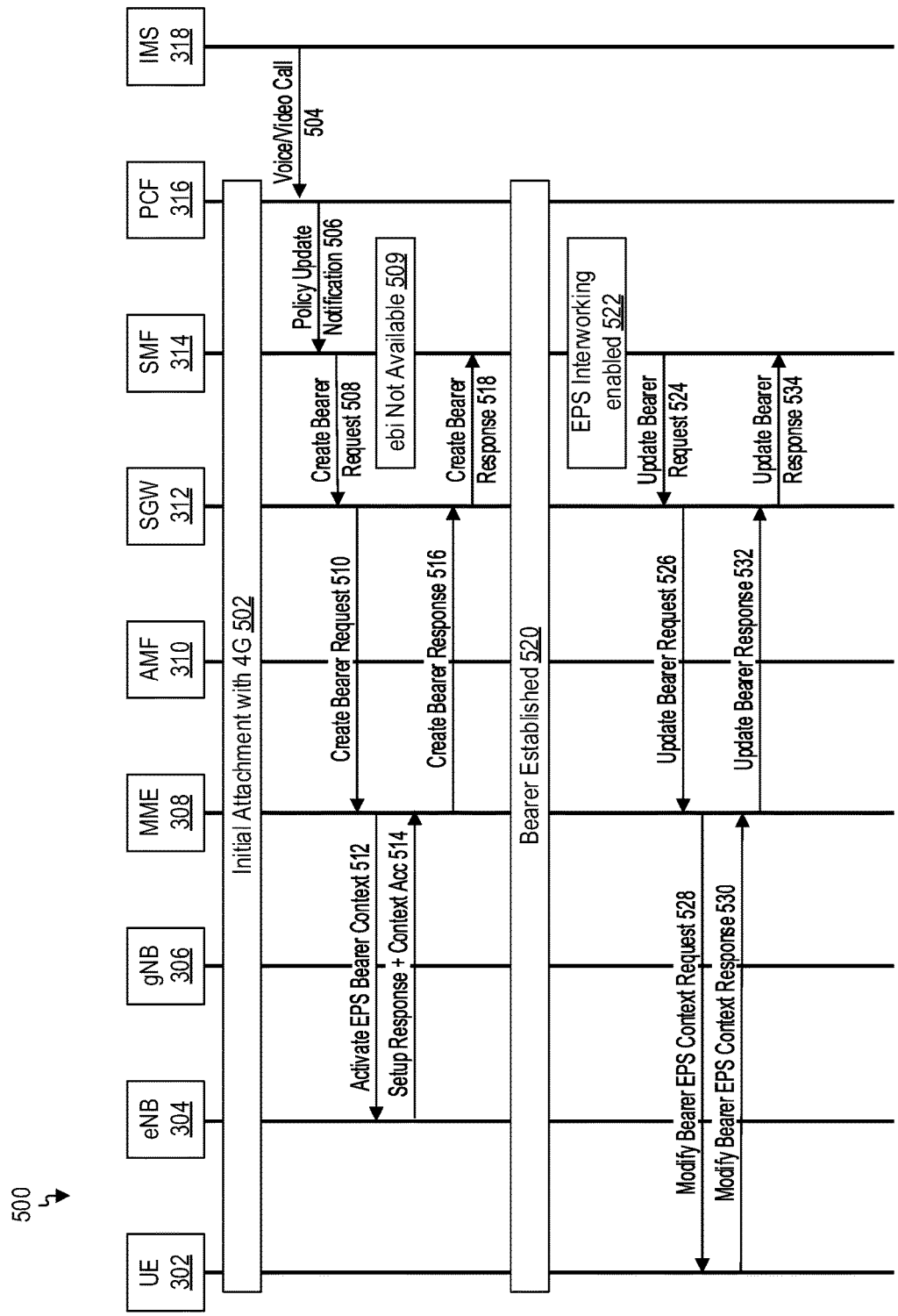
FIG. 5 illustrates a flow diagram for restoring a mapping between a Quality of Service (QoS) policy and an evolved packet system (EPS) bearer indicator (EBI) in a user equipment (UE) according to an example of the instant disclosure.

FIG. 5 illustrates a flow diagram 500 for restoring a mapping between QoS flow-descriptions (specifically QFI) and an EBI in a UE according to an example of the instant disclosure. To prevent the handover issues described above, the SMF can be modified to, in response to receiving a create bearer response with an EBI, transmit an update bearer request containing the QoS flow-descriptions with an EBI received in the create bearer response when interworking is enabled. In some examples, the UE will receive the update bearer context and update the mapping between the EBI to the QFI. The UE will not delete the EBI in this context and will not drop calls when migrating between different RATs.

The flow diagram initially starts at block 502 with an initial attachment with 5G, as described above in connection with FIG. 3A. The IMS 318 transmits a voice or video call notification to the PCF 316 at block 504, which transmits a policy update notification 506 to the SMF 314. The SMF transmits a create bearer request 508 to the SGW 312 with an ePCO indicating QoS rules and QoS flow descriptions. At block 509, the EBI is not available to the SMF 314 and therefore does not include the EBI in the create bearer request 508. The SGW 312 transmits a bearer request 510 to the MME 308, which transmits an active EPS bearer context 512 to the eNB 304. In response, the eNB 304 transmits an EPS bearer setup response and an activate dedicated EPS bearer context accept 514, which may be two messages, to the MME 308. The MME 308 transmits a create bearer response 516 to the SGW 312, which will include an EBI mapped to a QoS flow description. The SGW 312 will then transmit a create bearer response 518 with an EBI to establish the voice or video bearer at block 520.

In response to the create bearer response 518, the SMF 314 will determine whether interworking between 4G and 5G is enabled at block 522. If the interworking between 4G and 5G is enabled at block 522, the SMF 314 will update the UE with the EBI to update the mapping between EBI and QoS flow description to prevent the bearer from being locally deleted to trigger a delete bearer. The SMF 314 achieves this by transmitting an update bearer request 524 that includes the EBI and mapped to the QoS flow description to the SGW 312. In response, the SGW 312 transmits an update bearer request 526 including the EBI and mapped to the QoS flow description to the MME 308.

The MME 308 transmits a modify bearer EPS context request 528 to the UE 302 that includes the EBI and mapped to the QoS flow description. After receiving the modify bearer EPS context request 528, the UE 302 transmits a modify bearer EPS context response 530 to the MME 308, the MME 308 transmits an update bearer response 532 indicating that the UE 302 accepted the context to the SGW 312, and the SGW 312 transmits an update bearer response 534 indicating that the UE 302 accepted the context to the SMF 314.

In the event of handovers, the UE 302 will be able to map back to the bearer when migrating between RATs and prevent call failures (e.g., voice, video, RCS, etc.) that are currently being experienced by pre 16.3 release UEs. In this case, the SMF 314 can be modified and the initiated procedure comports with existing processes to prevents inter-RAT handover failure.

Although FIG. 5 is described in connection with a voice or video call, the description also applies to an RCS call and prevent inter-RAT issues.

Figure 6:
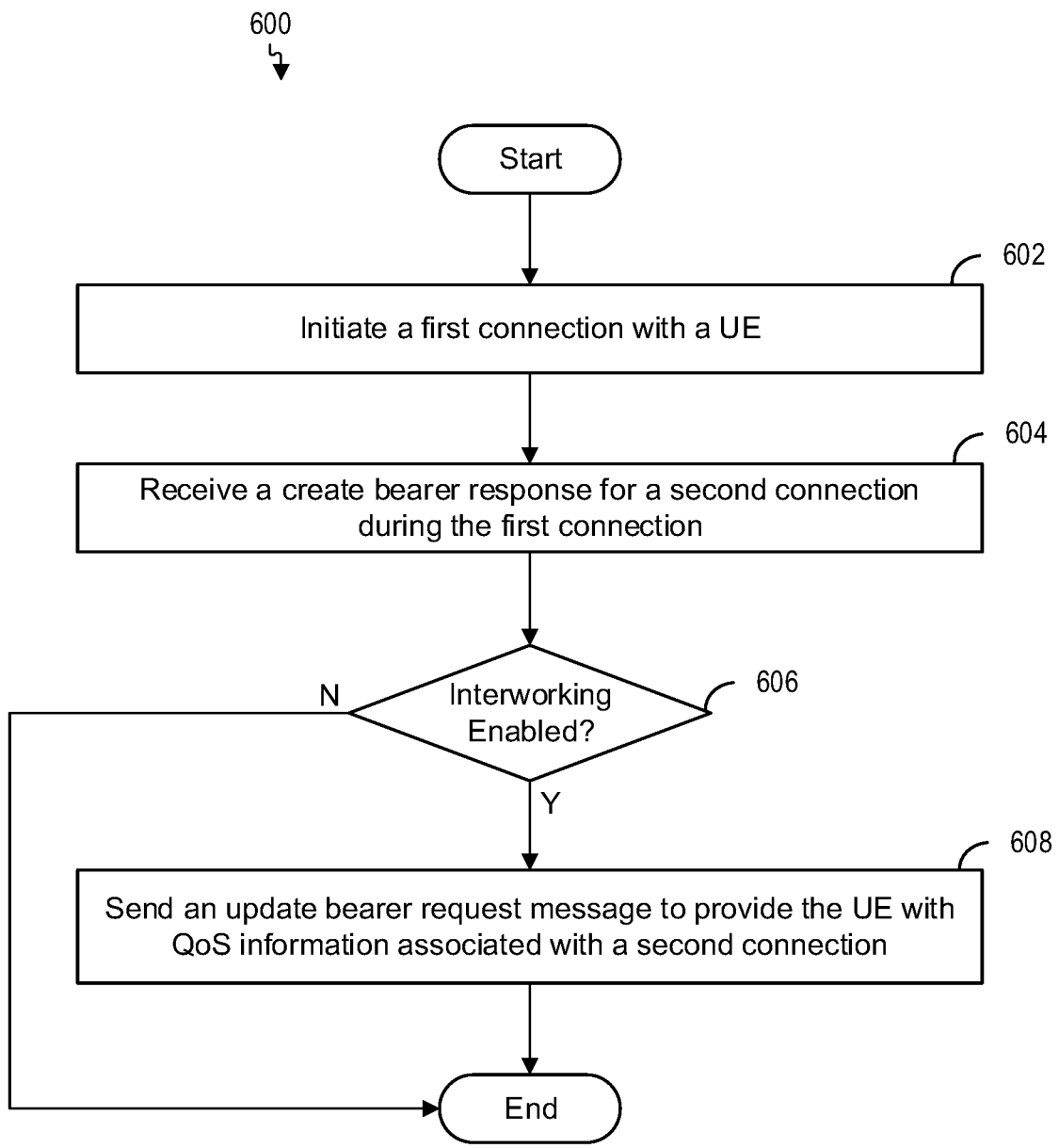
FIG. 6 illustrates a flowchart of a method for restoring a mapping between a QoS flow description and an EBI in a UE according to an example of the instant disclosure.

FIG. 6 illustrates a flowchart of a method 600 for restoring a mapping between QoS flow descriptions and an EBI in a UE according to an example of the instant disclosure. In some examples, the method 600 may be executed by the SMF and prevent call failure during an inter-RAT handover as described above.

The method 600 includes initiating a first connection with a UE at block 602. For example, the SMF may initiate a 4G connection with the UE at block 602. After initiating the first connection, the method 600 may receive a create bearer response for a second connection during the first connection at block 604. The create bearer response may be related to an inter-RAT handover or during a voice/video/RCS call in a 4G connection. For example, the create bearer response is used when a 4G connection and a voice/video/RCS call is made and, in some cases, the create bearer response is sent as part of a 5G connection to a 4G connection during EPS fallback, i.e., when a gNB cannot support VoNR, the gNB may need to hand over the UE to a LTE connection for a VoLTE function.

In response to receiving the create bearer response, the method 600 includes determining whether interworking is enabled between the 5GC and the EPC at block 606. The interworking with the EPC places dependencies on the backend business support systems (BSS) system integration because user data and policies need to support two networks (the EPC and 5GC). The network devices must support 5GS-related capabilities in UEs while simultaneously supporting legacy UEs that will continue to exist in the future.

If it is determined that interworking is enabled at block 606, the method 600 includes sending an update bearer request message to provide the UE with QoS information associated with a second connection at block 608.

Figure 7:
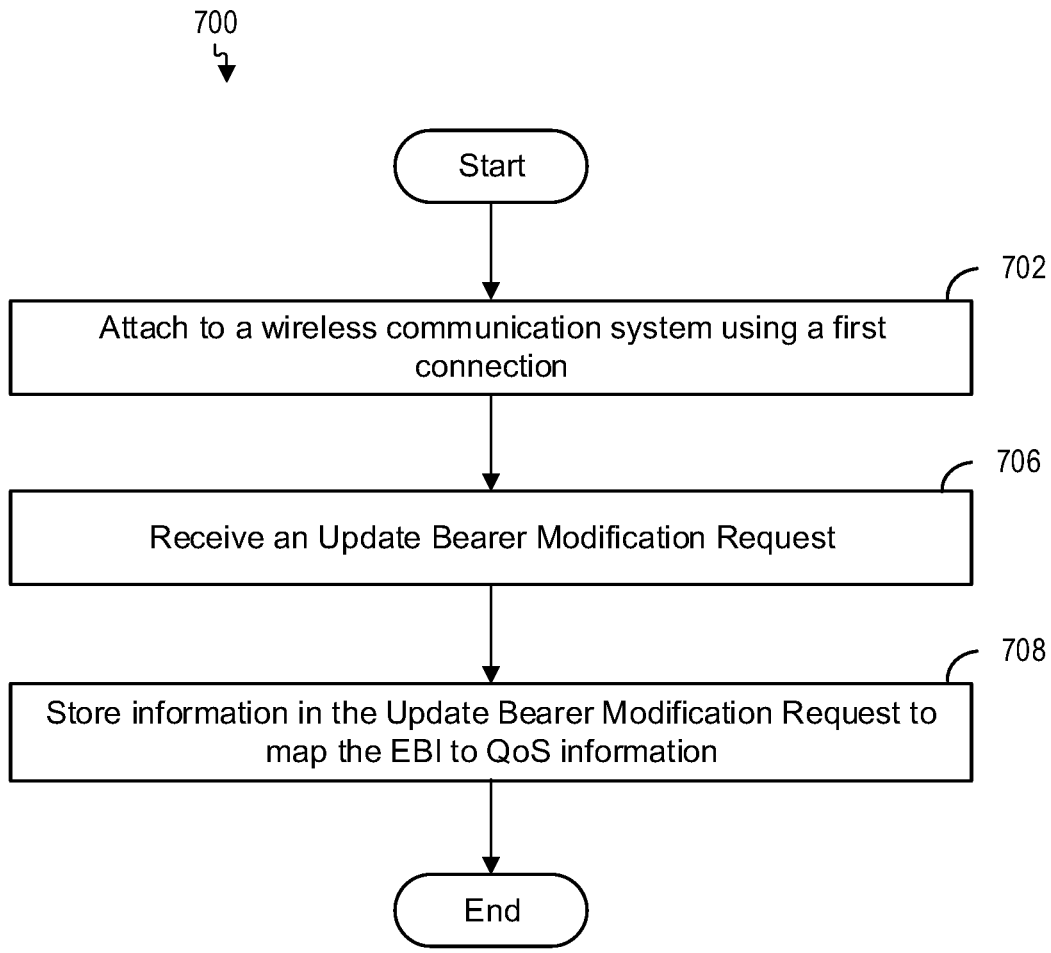
FIG. 7 illustrates a flowchart of a method for restoring a mapping between a QoS flow description and an EBI in a UE according to an example of the instant disclosure.
Figure 8:
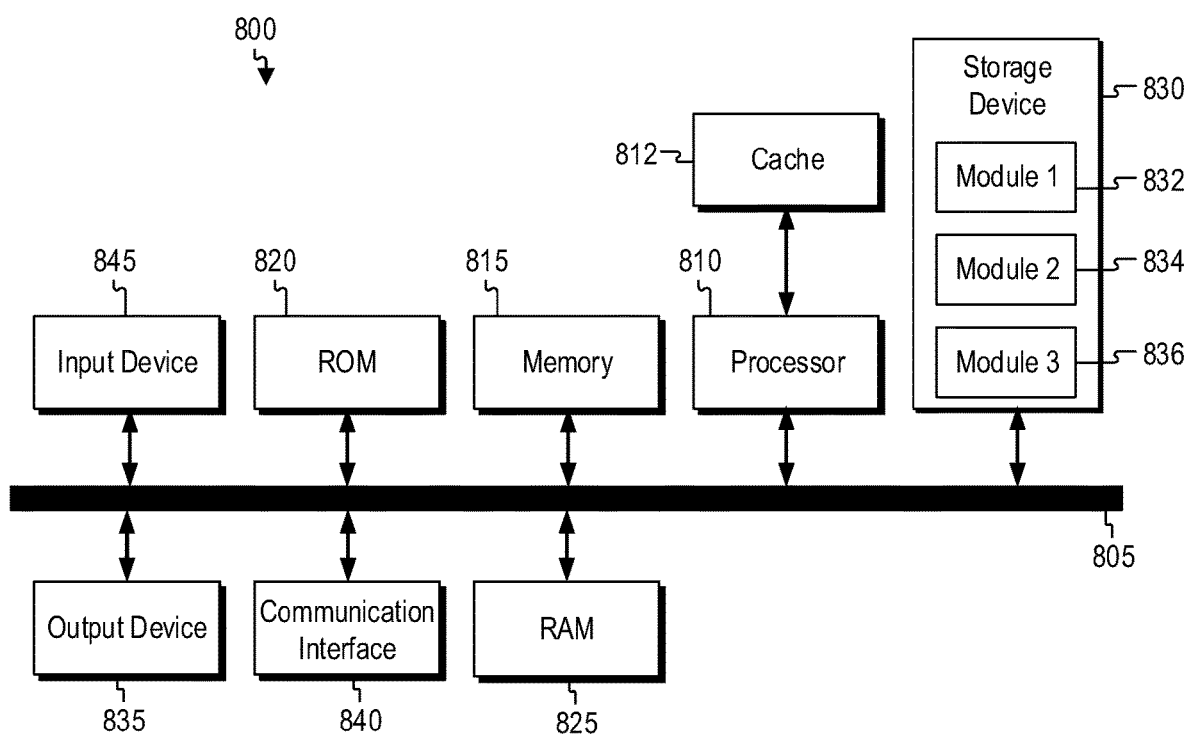
FIG. 8 illustrates an example of computing system according to an example of the instant disclosure.

FIG. 7 illustrates a flowchart of a method 700 for restoring a mapping between QoS QoS flow descriptions and an EBI in a UE according to an example of the instant disclosure. In some examples, the method 600 may be executed by the UE. In some examples, the UE may be executing a specification that predates release 16.3 that locally deletes QoS flow description and all associated QoS rules when the EBI is not included in the QoS description and there is more than one QoS flow description available.

The method 700 includes attaching to a wireless communication system using a first connection (e.g., 4G, 5G) at block 702. In some examples, the UE may delete an EBI mapping to the QoS flow description. For example, a UE may be executing a specification that predates release 16.3, when the EBI is not included in the QoS description and there is more than one QoS flow description available, the UE may locally delete the EBI mapping to QoS flow description.

In some cases, the UE may be connected to an SMF that addresses the deleted mapping to the QoS flow description. For example, the UE may receive an update bearer modification (e.g., a update bearer request) at block 708 that will cause the UE to update the QoS-flow-description with the provided EBI in the update bearer request at block 706. The UE can then store the information in the update bearer modification request to ensure that QoS information can be maintained for inter-RAT handover.

FIG. 8 shows an example of computing system 800, which can be for example any computing device that can be included in UE 302, eNB 304, gNB 306, MME 308, AMF 310, SGW 312, SMF 314, PCF 316, and IMS 318, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU) such as a processor 810 (e.g., a implemented in circuitry) and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, RAM, ROM, and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, universal serial bus (USB) devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A method of updating QoS information from a SMF to ensure continuity of service for a mobile device switching between a 4G network and a 5G network, comprising: sending a create bearer request during for setup of a service with the mobile device during a first connection, wherein the create bearer request includes QoS information for the service; receiving a create bearer response message to setup a second connection based on the service, wherein the mobile device cannot provide the service with the first connection; and in response to the create bearer response message, sending an update bearer request message to provide the mobile device with the QoS information associated with a second connection.

Aspect 2. The method of Aspect 1, wherein the mobile device deletes the QoS information associated with the second connection during handover, and wherein the update bearer request message restores the QoS information associated with the second connection.

Aspect 3. The method of any of Aspects 1 to 2, further comprising: determining that interworking is enabled, wherein the update bearer request message is sent when the interworking is enabled.

Aspect 4. The method of any of Aspects 1 to 3, wherein the second connection comprises a 5G connection based on a dedicated bearer and the first connection comprises a 4G connection based on a default bearer.

Aspect 5. The method of any of Aspects 1 to 4, wherein the mobile device initially attaches using the 4G connection.

Aspect 6. The method of any of Aspects 1 to 5, wherein the update bearer request message includes an EPS bearer indicator included in the create bearer response message, wherein the create bearer response message includes the EPS bearer indicator.

Aspect 7. The method of any of Aspects 1 to 6, wherein the EPS bearer identifier of the second connection and the QoS information are associated with the second connection.

Aspect 8. The method of any of Aspects 1 to 7, wherein the create bearer response message establishes the second connection with the mobile device.

Aspect 9: A SMF for updating QoS information to ensure continuity of service for a mobile device switching between a 4G network and a 5G network includes a storage (implemented in circuitry) configured to store instructions and a processor. The processor configured to execute the instructions and cause the processor to: send a create bearer request during for setup of a service with the mobile device during a first connection, wherein the create bearer request includes QoS information for the service; receive a create bearer response message to setup a second connection based on the service, wherein the mobile device cannot provide the service with the first connection; and in response to the create bearer response message, send an update bearer request message to provide the mobile device with the QoS information associated with a second connection.

Aspect 10: The SMF of Aspect 9, wherein the mobile device deletes the QoS information associated with the second connection during handover to the second connection, and wherein the update bearer request message restores the QoS information associated with the second connection.

Aspect 11: The SMF of any of Aspects 9 to 10, wherein determining that interworking is enabled, wherein the update bearer request message is sent when the interworking is enabled.

Aspect 12: The SMF of any of Aspects 9 to 11, wherein the second connection comprises a 5G connection based on a dedicated bearer and the first connection comprises a 4G connection based on a default bearer.

Aspect 13: The SMF of any of Aspects 9 to 12, wherein the mobile device initially attaches using the 4G connection.

Aspect 14: The SMF of any of Aspects 9 to 13, wherein the update bearer request message includes an EPS bearer indicator included in the create bearer response message, wherein the create bearer response message includes the EPS bearer indicator.

Aspect 15: The SMF of any of Aspects 9 to 14, wherein the EPS bearer identifier of the second connection and the QoS information are associated with the second connection.

Aspect 16: SMF of any of Aspects 9 to 15, wherein the create bearer response message establishes the second connection with the mobile device.

Aspect 17: A computer readable medium for updating QoS information to ensure continuity of service for a mobile device switching between a 4G network and a 5G network comprising instructions using a computer system. The computer includes a memory (e.g., implemented in circuitry) and a processor (or multiple processors) coupled to the memory. The processor (or processors) is configured to execute the computer readable medium for updating QoS information to ensure continuity of service for a mobile device switching between a 4G network and a 5G network and cause the processor to: send a create bearer request during for setup of a service with the mobile device during a first connection, wherein the create bearer request includes QoS information for the service; receive a create bearer response message to setup a second connection based on the service, wherein a mobile device cannot provide the service with the first connection; and in response to the create bearer response message, send an update bearer request message to provide the mobile device with the QoS information associated with a second connection.

Aspect 18: The computer readable medium for updating QoS information to ensure continuity of service for a mobile device switching between a 4G network and a 5G network of Aspect 17, wherein the mobile device deletes the QoS information associated with the second connection during handover to the second connection, and wherein the update bearer request message restores the QoS information associated with the second connection.

Aspect 19: The computer readable medium for updating QoS information to ensure continuity of service for a mobile device switching between a 4G network and a 5G network of any of Aspects 17 to 18, wherein determining that interworking is enabled, wherein the update bearer request message is sent when the interworking is enabled.

Aspect 20: The computer readable medium for updating QoS information to ensure continuity of service for a mobile device switching between a 4G network and a 5G network of any of Aspects 17 to 19, wherein the second connection comprises a 5G connection based on a dedicated bearer and the first connection comprises a 4G connection based on a default bearer.

Aspect 21: The computer readable medium for updating QoS information to ensure continuity of service for a mobile device switching between a 4G network and a 5G network of any of Aspects 17 to 20, wherein the mobile device initially attaches using the 4G connection.

Aspect 22: The computer readable medium for updating QoS information to ensure continuity of service for a mobile device switching between a 4G network and a 5G network of any of Aspects 17 to 21, wherein the update bearer request message includes an EPS bearer indicator included in the create bearer response message, wherein the create bearer response message includes the EPS bearer indicator.

Aspect 23: The computer readable medium for updating QoS information to ensure continuity of service for a mobile device switching between a 4G network and a 5G network of any of Aspects 17 to 22, wherein the EPS bearer identifier of the second connection and the QoS information are associated with the second connection.

Aspect 24: The computer readable medium for updating QoS information to ensure continuity of service for a mobile device switching between a 4G network and a 5G network of any of Aspects 17 to 23, wherein the create bearer response message establishes the second connection with the mobile device.

What is claimed is:

1. A method of ensuring continuity of service for a mobile device during a handover process, comprising:
    sending a create bearer request for establishing a service for the mobile device using a first connection, wherein the create bearer request includes QoS information for the service;
    receiving a create bearer response message to setup a second connection for the mobile device to continue the service, wherein the mobile device cannot provide the service with the first connection; and
    in response to the create bearer response message, sending an update bearer request message to provide the mobile device with the QoS information associated with the second connection, the QoS information allowing the mobile device to verify an existing QoS flow and to continue the service after the handover process,
    wherein the mobile device deletes the QoS information associated with the second connection during handover to the second connection, and wherein the update bearer request message restores the QoS information associated with the second connection for the mobile device to verify the existing QoS flow.

2. The method of claim 1, further comprising:
    determining that interworking is enabled, wherein the update bearer request message is sent when the interworking is enabled.

3. The method of claim 2, wherein the mobile device initially attaches to a 4G network using a default bearer for the first connection.

4. The method of claim 1, wherein the QoS information includes an EPS bearer indicator.

5. The method of claim 4, wherein the EPS bearer indicator and additional information included as part of the QoS information are associated with the second connection.

6. The method of claim 5, wherein the create bearer response message establishes the second connection with the mobile device.

7. The method of claim 1, wherein the update bearer request message includes an EPS bearer indicator included in the create bearer response message, wherein the create bearer response message includes the EPS bearer indicator.

8. A session management function (SMF) device for updating quality of service (QoS) information to ensure continuity of service for a mobile device switching between a 4G network and a 5G network, comprising:
    a storage configured to store instructions; and
    a processor configured to execute the instructions and cause the processor to:
        send a create bearer request during for setup of a service with the mobile device during a first connection, wherein the create bearer request includes QoS information for the service;
        receive a create bearer response message to setup a second connection based on the service, wherein the mobile device cannot provide the service with the first connection; and
        in response to the create bearer response message, send an update bearer request message to provide the mobile device with the QoS information associated with the second connection,
    wherein the mobile device initially attaches using a default bearer for the 4G connection.

9. The SMF device of claim 8, wherein the mobile device deletes the QoS information associated with the second connection during handover to the second connection, and wherein the update bearer request message restores the QoS information associated with the second connection.

10. The SMF device of claim 8, wherein the processor configured to execute the instructions and cause the processor to determine that interworking is enabled, wherein the update bearer request message is sent when the interworking is enabled.

11. The SMF device of claim 8, wherein the update bearer request message includes an EPS bearer indicator included in the create bearer response message, wherein the create bearer response message includes the EPS bearer indicator.

12. The SMF device of claim 11, wherein the EPS bearer indicator of the second connection and the QoS information are associated with the second connection.

13. The SMF device of claim 12, wherein the create bearer response message establishes the second connection with the mobile device.

14. The SMF device of claim 8, wherein the QoS information includes an EPS bearer indicator.

15. A non-transitory computer readable medium for updating quality of service (QOS) information to ensure continuity of service for a mobile device switching between a 4G network and a 5G network comprising instructions, the instructions, when executed by a computing system, cause the computing system to:
   send a create bearer request during for setup of a service with the mobile device during a first connection, wherein the create bearer request includes QoS information for the service;
   receive a create bearer response message to setup a second connection based on the service, wherein the mobile device cannot provide the service with the first connection; and
   in response to the create bearer response message, send an update bearer request message to provide the mobile device with the QoS information associated with the second connection,
   wherein the mobile device initially attaches using a default bearer for the 4G connection.

16. The computer readable medium of claim 15, wherein the mobile device deletes the QoS information associated with the second connection during handover to the second connection, and wherein the update bearer request message restores the QoS information associated with the second connection.

17. The computer readable medium of claim 15, wherein the instructions, when executed by the computing system, cause the computing system to:
   determine that interworking is enabled, wherein the update bearer request message is sent when the interworking is enabled.

18. The computer readable medium of claim 15, wherein the update bearer request message includes an EPS bearer indicator included in the create bearer response message, wherein the create bearer response message includes the EPS bearer indicator.

19. The computer readable medium of claim 15, wherein the EPS bearer indicator of the second connection and the QoS information are associated with the second connection.

20. The computer readable medium of claim 15, wherein the QoS information includes an EPS bearer indicator.

* * * * *